2,724,716

1-AMINO-2-TRIFLUOROMETHYL-4-PHENYL-AMINOANTHRAQUINONE COMPOUNDS

Joseph B. Dickey and Edmund B. Towne, Kingsport, Tenn., assignors to Eastman Kodak Company, Rochester, N. Y., a corporation of New Jersey No Drawing. Application September 5, 1951,
Serial No. 245,272

8 Claims. (Cl. 260—380)

This invention relates to new anthraquinone compounds and their application to the art of dyeing or coloring.

We have discovered that the anthraquinone compounds having the general formula:

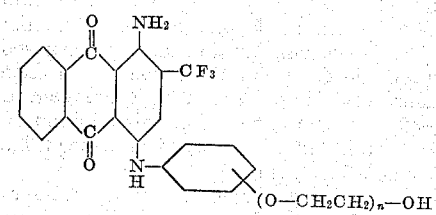

wherein $n$ represents 3, 4, 5 or 6 are valuable dyes for coloring textile materials made of or containing a cellulose alkyl carboxylic acid ester having two to four carbon atoms in the acid groups thereof. They are particularly of use for the coloration of cellulose acetate textile materials and yield greenish-blue shades thereon which have excellent fastness to light and good fastness to gas.

It is an object of our invention to provide new anthraquinone compounds. Another object is to provide a satisfactory process for the preparation of the new anthraquinone compounds of the invention. A further object is to provide dyed cellulose alkyl carboxylic acid ester textile materials which possess good to excellent fastness to light and gas. A particular object is to provide new anthraquinone compounds which are of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate. Our new anthraquinone compounds color textile materials made of the aforesaid cellulose alkyl carboxylic acid esters greenish-blue shades.

The anthraquinone compounds of our invention are prepared by condensing 1-amino-2-trifluoromethyl-4-bromoanthraquinone with a primary arylamine having the formula:

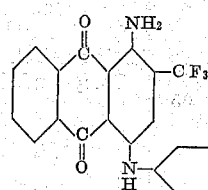

wherein $n$ represents 3, 4, 5 or 6. The condensation reaction is ordinarily effected by heating the reaction mixture under refluxing conditions until the reaction is complete. Ordinarily a small excess of the aniline compound over that theoretically required is employed. Normally the reaction is carried out in the presence of an inert diluent such as n-butyl alcohol or n-amyl alcohol. Similarly, an acid-binding agent such as potassium acetate, sodium acetate, sodium bicarbonate or potassium bicarbonate, for example, is usually present during the reaction.

Normally the condensation reaction is carried out in the presence of a copper salt catalyst. So far as we are aware, almost any cupric salt is useful as a catalyst. Thus, cupric sulfate (either with or without water of crystallization), cupric acetate, cupric bromide, cupric chloride and cupric iodide can be used. The use of cupric sulfate and cupric acetate is preferred.

Typical of the primary arylamines used in the preparation of the anthraquinone compounds of our invention are, for example, o-(β-hydroxyethoxyethoxyethoxy)aniline, m-(β-hydroxyethoxyethoxyethoxy)aniline, p-(β-hydroxyethoxyethoxyethoxy)aniline, o-(β-hydroxyethoxyethoxyethoxyethoxy)aniline, m-(β-hydroxyethoxyethoxyethoxyethoxy)aniline, p-(β-hydroxyethoxyethoxyethoxyethoxy)aniline, o-(β-hydroxyethoxyethoxyethoxyethoxyethoxy)aniline, p-(β-hydroxyethoxyethoxyethoxyethoxyethoxy)aniline, o-(β-hydroxyethoxyethoxyethoxyethoxyethoxyethoxy)aniline and p-(β-hydroxyethoxyethoxyethoxyethoxyethoxyethoxy)aniline.

If desired, the dye compounds of our invention can be purified by crystallization from a solvent for the dyes such as toluene or xylene.

The following examples illustrate the anthraquinone compounds of our invention and the manner in which they may be prepared.

EXAMPLE 1

6.4 grams of 1-amino-2-trifluoromethyl-4-bromoanthraquinone, 5.7 grams of p-(β-hydroxyethoxyethoxyethoxy)aniline, 2 grams of potassium acetate, 0.2 gram CuSO₄·5H₂O and 32 ccs. of n-butyl alcohol are heated together under reflux for 3.5 hours. Then the reaction mixture is cooled and poured with stirring into 1 liter of cold water. The solid that separates is recovered by filtration on a Büchner funnel, washed with water, dried and then dissolved in 100 ccs. of boiling xylene. The greenish-blue solution which results is filtered and the filtrate is cooled indirectly with ice. 1-amino-2-trifluoromethyl-4-p-(β-hydroxyethoxyethoxyethoxyethoxy)phenylaminoanthraquinone crystallizes and is recovered by filtration and dried. It has the formula:

$$\text{structure} \quad -\text{O}-\text{CH}_2\text{CH}_2-\text{O}-\text{CH}_2\text{CH}_2-\text{O}-\text{CH}_2\text{CH}_2-\text{O}-\text{CH}_2\text{CH}_2\text{OH}$$

and melts at 99° C.–103° C.

EXAMPLE 2

6.4 grams of 1-amino-2-trifluoromethyl-4-bromoanthraquinone and 4.82 grams of p-(β-hydroxyethoxyethoxyethoxy)aniline are reacted together exactly in accordance with the procedure described in Example 1. 1-amino-2-trifluoromethyl - 4 - p-(β-hydroxyethoxyethoxy)-phenylaminoanthraquinone melting at 123° C.–127° C. is obtained.

EXAMPLE 3

Example 1 was repeated using 4.82 grams of o-(β-hydroxyethoxyethoxyethoxy)aniline in place of p-(β-hydroxyethoxyethoxyethoxyethoxy)aniline. 1 - amino-2-trifluoromethyl-4-o-(β - hydroxyethoxyethoxyethoxy)phenylaminoanthraquinone melting at 127° C.–132° C. is obtained.

EXAMPLE 4

Example 1 was repeated using 6.58 grams of p-(β-hydroxyethoxyethoxyethoxyethoxyethoxy)aniline in place of p - (β - hydroxyethoxyethoxyethoxyethoxy)aniline. 1-amino - 2 - trifluoromethyl - 4 - p - (β-hydroxyethoxyethoxyethoxyethoxy)phenylaminoanthraquinone is obtained.

EXAMPLE 5

6.4 grams of 1-amino-2-trifluoromethyl-4-bromoanthraquinone and 7.46 grams of p-(β-hydroxyethoxyethoxyethoxyethoxyethoxy)aniline are reacted together exactly in accordance with the procedure described in Example 1. 1 - amino - 2 - trifluoromethyl - 4 - p - (β - hydroxyethoxyethoxyethoxyethoxyethoxy)phenylaminoanthraquinone is obtained.

EXAMPLE 6

6.4 grams of 1-amino-2-trifluoromethyl-4-bromoanthraquinone and 4.82 grams of m-(β-hydroxyethoxyethoxyethoxy) aniline are reacted together exactly in accordance with the procedure described in Example 1. 1-amino-2-trifluoromethyl - 4 - m - (β - hydroxyethoxyethoxyethoxy)phenylaminoanthraquinone is obtained.

EXAMPLE 7

6.4 grams of 1-amino-2-trifluoromethyl-4-bromoanthraquinone and 5.7 grams of o-(β-hydroxyethoxyethoxyethoxy)aniline are reacted together exactly in accordance with the procedure described in Example 1. 1 - amino - 2 - trifluoromethyl - 4 - o - (β-hydroxyethoxyethoxyethoxy)phenylaminoanthraquinone is obtained.

Following the procedure described in Example 1, 1 - amino - 2 - trifluoromethyl - 4 - m - (β-hydroxyethoxyethoxyethoxy)phenylaminoanthraquinone, 1 - amino - 2 - trifluoromethyl - 4 - o - (β - hydroxyethoxyethoxyethoxyethoxy)phenylaminoanthraquinone and 1-amino - 2 - trifluoromethyl - 4 - o - (β - hydroxyethoxyethoxyethoxyethoxyethoxy)phenylaminoanthraquinone, for example, are also readily obtained.

Compounds having the formula:

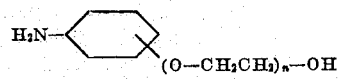

wherein $n$ represents 3, 4, 5 or 6 and wherein the —(O—CH$_2$CH$_2$)$_n$—OH group is in ortho or para position to the —NH$_2$ group, are prepared by condensing a chloronitrobenzene compound of the formula:

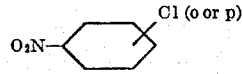

with a sodium alcoholate of the formula:

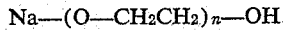

wherein $n$ represents 3, 4, 5 or 6 and then reducing the resulting nitro compound with hydrogen, in the presence of a nickel catalyst, especially of the Raney type, in methanol, at from 80° C. to 100° C. in an autoclave under a hydrogen pressure of 400 to 1800 pounds per square inch. The initial condensation of the chloronitrobenzene compound and the sodium alcoholate is advantageously carried out at 90° C. to 100° C. for about 20 hours.

The sodium alcoholates are prepared by adding sodium to the alcohols of the formula:

wherein $n$ represents 3, 4, 5 or 6.

The above process will be illustrated with reference to the preparation of o-(β-hydroxyethoxyethoxyethoxy)aniline.

*Preparation of o - (β - hydroxyethoxyethoxyethoxy) nitrobenzene*

2635 g. of triethylene glycol (B. P. 141–143° C./4 mm.) are placed in a 5-liter 3-necked flask equipped with a mechanical stirrer, air condenser protected by a calcium chloride tube, a thermometer, and an addition tube for solids. Stirring is started and the temperature of the triethylene glycol raised to 90° C. The source of heat is then removed, and 101 g. of metallic sodium cut into ⅜″ squares are added over a period of about two hours, keeping the temperature at 105–115° C.

When all the sodium has reacted, the flask is cooled to 85–90° C., and 693 g. of o-nitrochlorobenzene is added in 40–50 g. portions over a period of two hours, keeping the temperature at 100–110° C. The first few additions of o-nitrochlorobenzene usually cause vigorous reaction, but a noticeable rise in temperature should be observed with each addition, thus avoiding the danger of an accumulation of unreacted material with a consequent uncontrollable reaction later on. After this addition is complete, the reaction mixture is heated on a steam bath for about 16 hours with stirring.

The reaction mixture is then allowed to cool to 50–60° C. and is poured into 3.5 liters of water at room temperature. This relatively small amount of water thins out the reaction mixture and dissolves the salt without causing the product, which is a liquid at room temperature, to separate out appreciably. The o-(β-hydroxyethoxyethoxyethoxy)nitrobenzene is then extracted from the water-triethylene glycol mixture with four 1500 cc. portions of benzene. These combined benzene extracts are washed once with a small amount of water to remove any salt and the benzene removed by distillation. The yield of o-(β-hydroxyethoxyethoxyethoxy)nitrobenzene ranges from 913 to 1003 g. (76.5–84%). It is a viscous red-brown oil. When the nitro compound is to be reduced, only part of the benzene need be removed by distillation as the reduction can be carried out in benzene solution.

*Preparation of o-(β-hydroxyethoxyethoxyethoxy)aniline*

457 gms. of o-(β-hydroxyethoxyethoxyethoxy)nitrobenzene prepared as described above were placed in a shaking autoclave together with 450 cc. of ethyl alcohol and 7.5 grams of Raney nickel. The reduction reaction was carried out with shaking at 90° C.–105° C. and 1500 pounds per square inch hydrogen pressure. The reaction product from two runs as described above was filtered to remove the Raney nickel and the ethyl alcohol was removed by distillation. The desired product was then recovered by distilling the remainder of the reaction mixture under reduced pressure. The yield of product (B. P. 205° C.–210° C./3.5 mm.) was 648 grams or 80% of the theoretical.

Compounds having the formula:

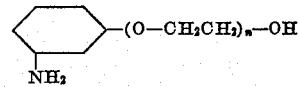

wherein $n$ represents 3, 4, 5 or 6 are obtained by reduction of the corresponding nitro compound. This reduction can conveniently be carried out at a temperature of 75° C.–100° C. with hydrogen under pressure in the presence of Raney nickel as a catalyst in the presence of an inert solvent or diluent such as ethyl alcohol.

Compounds having the formula:

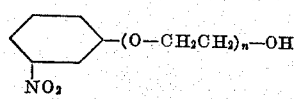

wherein $n$ represents 3, 4, 5 or 6 are obtained by reacting a compound having the formula:

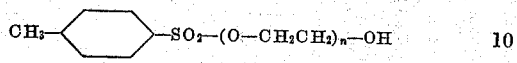

wherein $n$ represents 3, 4, 5 or 6 with m-nitrophenol in its sodium or potassium salt form. These latter compounds are in turn obtained by reacting an alcohol having the formula:

$$H—(O—CH_2CH_2)_n—OH$$

wherein $n$ represents 3, 4, 5 or 6 with p-toluenesulfonyl chloride. The series of reactions just referred to will be illustrated with reference to the preparation of m-(β-hydroxyethoxyethoxyethoxy)aniline.

*Preparation of m-(β-hydroxyethoxyethoxyethoxy)nitrobenzene*

107 grams of triethylene glycol-p-toluene sulfonate

49 grams of m-nitrophenol, 14 grams of NaOH and 127 cc. of water were heated to boiling for 6 hours. Then 200 cc. of water were added and the insoluble liquid which formed was separated in a separatory funnel and washed twice with H₂O. Upon crystallization from ethyl alcohol, 33 grams of crystals melting at 83° C.–85° C. were obtained.

*Preparation of m-(β-hydroxyethoxyethoxyethoxy)aniline*

33 grams of m-(β-hydroxyethoxyethoxyethoxy)nitrobenzene obtained as described above were dissolved in 50 cc. of ethyl alcohol and placed in a shaking autoclave. The nitro compound was then reduced under 1500 pounds hydrogen pressure at 75° C.–100° C. for three to four hours. The reaction mixture was then cooled, filtered, and the filtrate distilled under reduced pressure to recover the m-(β-hydroxyethoxyethoxyethoxy)aniline which boils at 195° C.–205° C./2½ mm.

*Preparation of p-triethyleneglycol-p-toluene sulfonate*

236 grams of triethylene glycol and 75 grams of p-toluene sulfonyl chloride were placed in a 2-liter 3-necked flask equipped with a stirrer, thermometer and dropping funnel. Then 157 cc. of 5 N NaOH were added dropwise, with stirring, at such a rate that the temperature (external cooling was employed) remained below 15° C. After the addition of the NaOH, another 75 grams of p-toluene sulfonyl chloride were added to the reaction mixture and another 157 cc. of 5 N NaOH were added dropwise, with stirring, while maintaining the temperature below 15° C. The reaction mixture was then stirred for 4 hours more. The p-triethylene-glycol-p-toluene sulfonate formed separated slowly as a white plastic solid and was recovered by filtration and dried in a vacuum desiccator. The yield obtained was 45% of the theoretical.

*Preparation of hexaethyleneglycol*
$$H—(O—CH_2CH_2)_6—OH$$

This compound is prepared by forming the monosodium salt of tetraethyleneglycol in excess glycol and reacting it with monochlorodiethyleneglycol.

(1) $H—(O—CH_2CH_2)_4—OH + Na \rightarrow$
$H—(O—CH_2CH_2)_4—ONa$ (2) $H—(O—CH_2CH_2)_4—ONa +$
$ClCH_2CH_2OCH_2CH_2OH \rightarrow$
$H—(O—CH_2CH_2)_6—OH + NaCl$ After filtering off the salt and distilling off the excess tetraethyleneglycol hexaethyleneglycol boiling at about 230° C.–240° C./1 mm. is obtained.

Hexaethyleneglycol was also obtained by distilling technical polyethyleneglycol (Carbide and Carbon) at 1 mm. pressure. After taking off a forerun of 20% of the total polyethyleneglycol a middle cut comprising 60% (by volume) of the total charge was collected as hexaethyleneglycol boiling at about 230° C.–240° C./1 mm.

*Preparation of pentaethyleneglycol*
$$H—(O—CH_2CH_2)_5—OH$$

396 grams of tetraethyleneglycol, B. P. 172/3 mm. were mixed with 2 liters of diethyleneglycol diethyl ether as solvent and reacted at 100° C.–130° C. with 46 grams of metallic sodium, the sodium being slowly added. After the reaction was complete, 160 grams of ethylene chlorohydrin were added dropwise, with stirring, at room temperature. The temperature rose during the addition of the ethylene chlorohydrin. The reaction mixture was then heated at 100° C.–130° C. for 3 hours. Upon cooling, the salt formed was filtered off and the diethyleneglycol diethyl ether solvent was distiled off leaving a good yield of pentaethyleneglycol boiling at about 190° C./1 mm.

The anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70°–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45°–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the general formula:

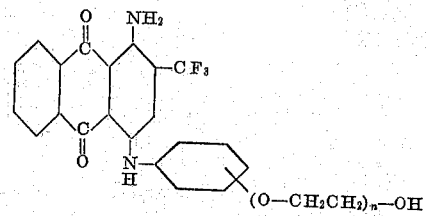

wherein $n$ represents a whole number selected from the group consisting of 3, 4, 5 and 6.

2. The anthraquinone compounds having the general formula:

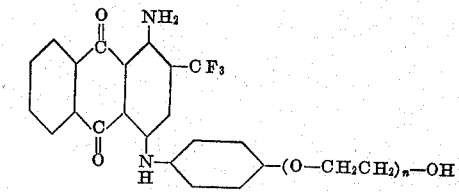

wherein $n$ represents a whole number selected from the group consisting of 3, 4, 5 and 6.

3. The anthraquinone compounds having the general formula:

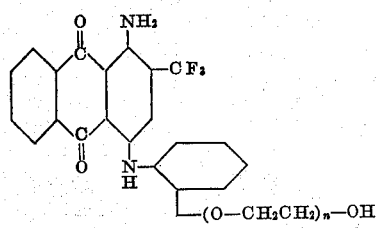
└─(O—CH₂CH₂)ₙ—OH wherein *n* represents a whole number selected from the group consisting of 3, 4, 5 and 6.

4. The anthraquinone compound having the formula:

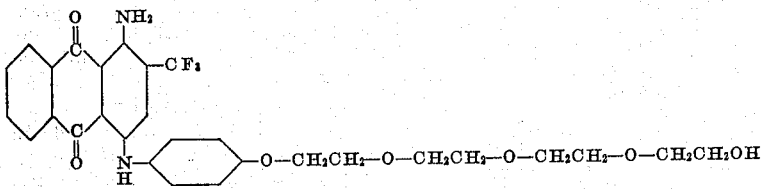

5. The anthraquinone compound having the formula:

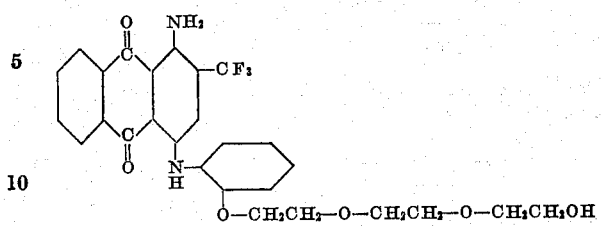

6. The anthraquinone compound having the formula:

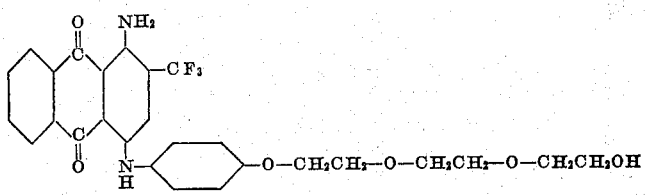

7. The anthraquinone compound having the formula:

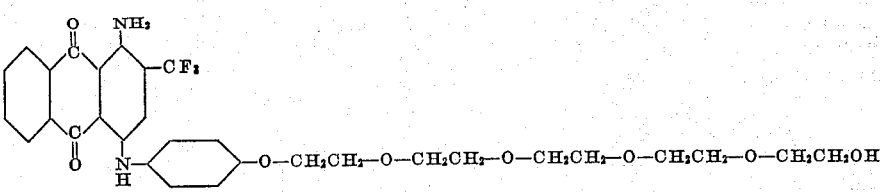

8. The anthraquinone compound having the formula:

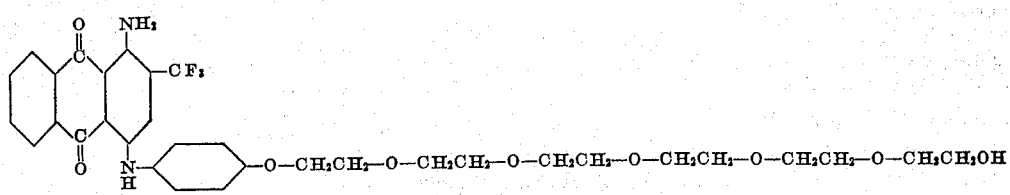

References Cited in the file of this patent
UNITED STATES PATENTS

| | | |
|---|---|---|
| 2,451,478 | Dickey et al. | Oct. 19, 1948 |
| 2,459,149 | Coover et al. | Jan. 18, 1949 |
| 2,466,008 | Dickey | Apr. 5, 1949 |
| 2,466,009 | Dickey | Apr. 5, 1949 |
| 2,487,045 | Dickey et al. | Nov. 8, 1949 |
| 2,510,088 | Dickey et al. | June 6, 1950 |
| 2,539,406 | Dickey et al. | June 30, 1951 |